United States Patent [19]
Mancuso

[11] Patent Number: 6,108,455
[45] Date of Patent: Aug. 22, 2000

[54] NON-LINEAR IMAGE FILTER FOR FILTERING NOISE

[75] Inventor: Massimo Mancuso, San Diego, Calif.

[73] Assignee: STMicroelectronics, Inc., Carrollton, Tex.

[21] Appl. No.: 09/087,403

[22] Filed: May 29, 1998

[51] Int. Cl.[7] .............................. G06K 9/40; G06T 5/40; G06T 5/20

[52] U.S. Cl. .......................... 382/261; 382/264; 382/275; 382/205

[58] Field of Search ..................................... 382/261, 205, 382/268, 156, 157, 275, 265, 264

[56] References Cited

U.S. PATENT DOCUMENTS

| | | | |
|---|---|---|---|
| 5,339,365 | 8/1994 | Kawai et al. | 382/156 |
| 5,390,264 | 2/1995 | Ishihara et al. | 382/54 |
| 5,561,724 | 10/1996 | Kido et al. | 382/261 |
| 5,694,492 | 12/1997 | Kim et al. | 382/268 |
| 5,818,964 | 10/1998 | Itoh et al. | 382/275 |
| 6,041,145 | 3/2000 | Hayashi et al. | 382/268 |

FOREIGN PATENT DOCUMENTS

| | | |
|---|---|---|
| 0 698 990 A1 | 2/1996 | European Pat. Off. . |
| 0 878 776 A1 | 11/1998 | European Pat. Off. . |

OTHER PUBLICATIONS

Frabiz, F.; Menhaj, M.B. A modified iterative fuzzy control based filter for image enhancement with multiplicative noise removal property IEEE Jurnal.

Mancuso, M.; D'Alto, V.; De Luca, R.; Poluzzi, R.; Rizzotto, G.G. Fuzzy logic based image processing in IQTV environment. Consumer Electronics, IEEE Jurnal.

Fotinos, A.; Laskaris, N.; Fotopoulos, S. Fuzzy color filtering using potential functions International Conference on Digital Signal Processing Proceedings. IEEE Jurnal.

Farbiz, F.; Motamedi, S. A.; Menhaj, M. B. An iterative method for image enhancement based on fuzzy logic International Conference on Acoustics, Speech and Signal Processing. IEEE Jurnal.

Hsu, Yuh–Feng and Yung–Chang Chen, "A New Adaptive Separable Median Filter For Removing Blocking Effects," *IEEE Trans. on Consumer Electron.*, 39(3):510–513, Aug. 1993.

Jarske et al., "Post–Filtering Methods For Reducing Blocking Effects From Coded Images," *IEEE Trans. on Consumer Electron.*, 40(3):521–526, Aug. 1994.

Ramamurthi, Bhaskar and Allen Gersho, "Nonlinear Space–Variant Postprocessing of Block Coded Images," *IEEE Trans. Acous., Speech, and Signal Proc.*, ASSP–34(5):1258–68, Oct. 1986.

Reeve III, Howard C. and Jae S. Lim, "Reduction of Blocking Effects in Image Coding," *Opt. Eng.*, 23(1):034–037, Jan.–Feb. 1984.

Reid et al., "Second–Generation Image Coding: An Overview," *ACM Computing Surveys*, 29(1):3–29, Mar. 1997.

*Primary Examiner*—Scott Rogers
*Assistant Examiner*—Gholam A Behpour
*Attorney, Agent, or Firm*—David V. Carlson; Theodore E. Galanthay; Lisa K. Jorgenson

[57] ABSTRACT

A system and method for reducing noise using recursive noise level estimation. The system and method for noise reduction substitute a target pixel in a processing window with a weighted average of a plurality of neighboring pixels according to the degree of similarity between the target pixel and the neighboring pixels. The similarity is based on the noise level affecting the image and the local brightness of the processing window. The filter is based on fuzzy logic and filters out noise without smoothing the image's fine details. The filter uses a human visual system (HVS) response to adjust brightness.

13 Claims, 5 Drawing Sheets

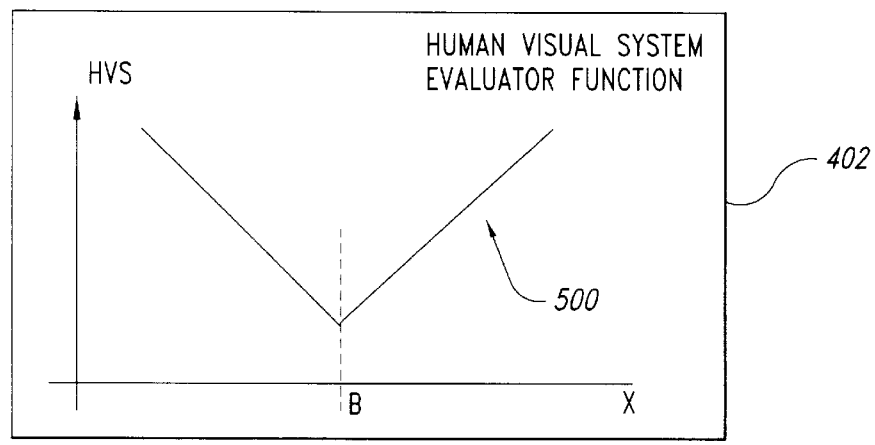
Fig. 1
Fig. 5
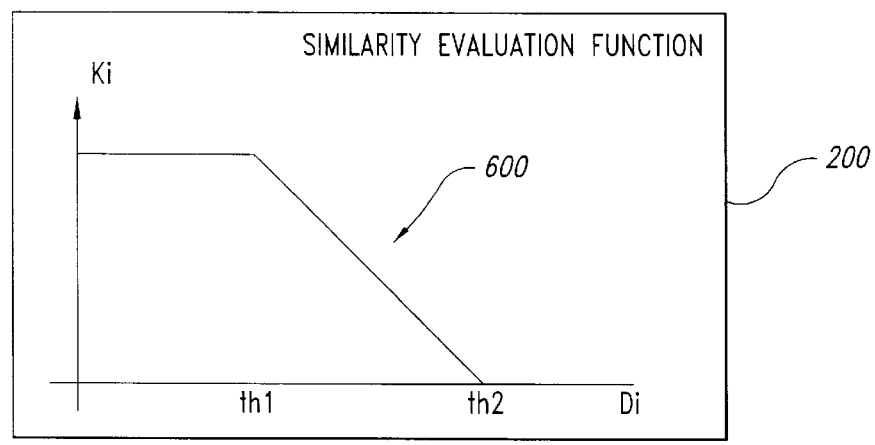
Fig. 6

NON-LINEAR IMAGE FILTER FOR FILTERING NOISE

TECHNICAL FIELD

The invention is related generally to digital signal processing and, in particular, digital signal processing of images.

BACKGROUND OF THE INVENTION

Noise is an inherent feature in any communication system, and efforts to reduce noise are continually being explored. For example, it is well known that low-pass filters with pre-set frequency ranges reduce high-frequency noise. Moreover, it is known that in many communication systems it is advantageous to reduce noise prior to displaying the signal (or image) because noise reduction improves image display quality.

Modern-day image processors also use other techniques to enhance image display. For example, image processes utilize compression (or encoding) techniques to minimize the amount of memory needed to process images. There are compression standards for still images (or pictures), color facsimile (fax) machines, medical imaging systems, video cassette records (VCRs), entertainment systems, televisions (TVs), high-definition TVs (HDTVs), World-Wide Web browsers, and for personal computer (PC) displays, for example.

The coding efficiency of an image processor can be improved if system noise is reduced prior to encoding. Adaptive filters have been applied to images for this purpose. For example, adaptive filters reduce noise by monitoring the communication system and feeding back communication system information to automatically and dynamically adjust their filtering characteristics. Generally, adaptive filters can be obtained using non-linear approaches, such as median-based filters or filters having variable behavior according to the estimation of certain system or image parameters. For example, some adaptive filters are obtained by estimating the temporal correlation of certain parameters.

These adaptive filters have limitations, however. For example, if a video signal is greatly affected by noise, these adaptive filters confuse the undesirable noise with image motion. This limitation causes the fine details of the image to be attenuated, or smoothed, which also is undesirable. Proposed solutions include variable-strength filters, i.e., filters with curved selectivity. Arbitrary curve selection, however, affects the temporal frequency of the adaptive filter, resulting in the so-called "comet effect," which is more annoying than detail smoothing. It can be appreciated therefore that what is needed is an image enhancement technique that reduces noise without blurring fine details of the image or affecting the temporal frequency.

SUMMARY OF THE INVENTION

Presented herein is a system and method for reducing noise using recursive noise level estimation. An example embodiment includes a noise filter that uses a processing window with a target pixel and several neighboring pixels. The noise filter includes an image processor that generates a replacement value for the target pixel in the processing window based on a weighted average of the absolute values of degrees of similarity between the target pixel and the plurality of neighboring pixels. The noise filter recursively processes the noise levels to adapt to the local features of the scanned image, as well as to adapt to changing noise levels of neighboring pixels. That is, the noise filter generates recursive noise level estimations whereby local feature data is fed back into the filter for calibration. The noise filter uses fuzzy logic processing to filter noise without smoothing the image.

Further features and advantages of the invention as well as the structure and operation of various embodiments are described in detail below.

BRIEF DESCRIPTION OF THE FIGURES

The invention is best understood by reference to the figures wherein references with like reference numbers indicate identical or functionally similar elements. In addition, the left-most digits refer to the figure in which the reference first appears in the accompanying figures.

FIG. 1 illustrates a processing window with a current row and a previous row suitable for use with an embodiment of the invention.

FIG. 5 is a graphical representation of the human visual system evaluator function utilized in the human visual system (HVS) evaluator of the local feature inspector in FIG. 3.

FIG. 6 is a graphical representation of the similarity evaluation function implemented by the similarity evaluation block of the noise filter of FIG. 1.

DETAILED DESCRIPTION OF THE INVENTION

Non-linear image filtering, and in particular, a non-linear image filtering system and method that reduce noise using recursive noise level estimation is described herein. In the following description, numerous specific details, such as specific mathematical, statistical, and signal processing symbols and relationships, specific methods of analyzing and processing images, video signals, video sequences, etc., are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

FIG. 1 illustrates a processing window 102 with several pixels X1, X2, X3, X4, X5, X6, X7, and X. The pixel X is the pixel to be processed, called the target pixel X. The remaining pixels X1, X2, X3, X4, X5, X6, X7 are neighboring pixels. The pixels X4, X5, X6, and X7 are neighboring pixels of the target pixel X belonging to a current scan line 104a. The pixels X1, X2, and X3 are the pixels belonging to a previous scan line 104b, which is the scan line preceding the current scan line 104a containing the target pixel X. According to an embodiment, one of the neighboring pixels is designated as a neighboring pixel X−1, which immediately follows the target pixel X. A second one of the neighboring pixels is designated as a neighboring pixel X−2, which immediately follows the neighboring pixel X−1.

Figure 2:
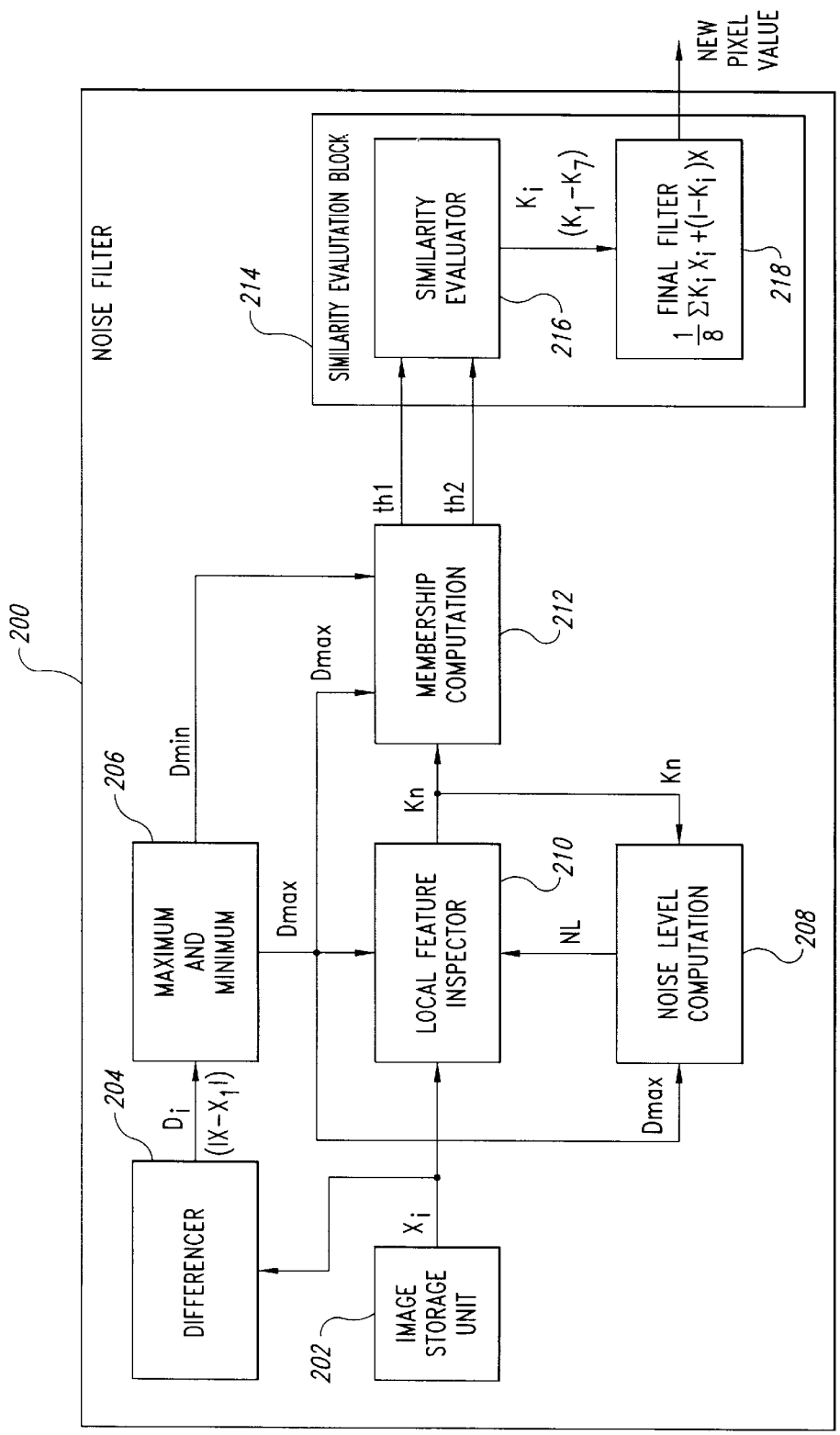
FIG. 2 is a high-level block diagram of a filter suitable for implementing an embodiment of the invention.

FIG. 2 is a high-level block diagram of a noise filter 200 suitable for implementing an embodiment of the invention.

According to this embodiment, the noise filter 200 includes an image storage unit 202, a differencer 204, a minimum and maximum block 206, a noise level computation block 208, a local feature inspector 210, a membership computation block, and a similarity evaluation block 214. The similarity evaluation block 214 includes a similarity evaluator 216 and a final filter 218. The filter 200 uses a fuzzy logic process along with recursive noise level estimations to replace a target pixel value with a new pixel value, which are described in detail below.

Typically the image is scanned sequentially row-by-row (or line-by-line) as a stream of pixels into the image storage unit 202. The stored image is divided into several image blocks, which are then partitioned into several pixels. The image storage unit 202 also generates the processing window 102, as is described in detail below.

The differencer 204 computes the absolute values of the differences $D_i$, which represents the differences between a value of the target pixel X and the values of the neighboring pixels $X_i$, where i is 1–7, such that $X_i$ represents the neighboring pixels X1–X7, and such that $D_i$ represents any one of the differences D1–D7. In one embodiment, the differencer 204 computes the absolute values of the differences $D_i$ between the target pixel X luminance and the luminance of the neighboring pixels X1–X7 to produce difference values D1–D7. As used herein, the "luminance" is generally defined as the attribute of visual perception in accordance with which a pixel appears to emit more or less light. "Luminance" is sometimes termed "brightness." Of course, those skilled in the art will appreciate that the invention is not limited to this embodiment. For example, the differencer 204 can also compute the absolute values of the differences $D_i$ between the target pixel X gray scale value and the gray scale values of the neighboring pixels X1–X7. As used herein, "gray scale value" generally is defined as a value on the "gray scale," which is a strip of shades ranging from black to white with intermediate shades of gray. Gray scale value may also be termed "gray level."

The maximum and minimum block 206 receives difference values D1–D7 and finds a maximum difference $D_{max}$ and a minimum difference $D_{min}$ selected from among the absolute values of the computed differences $D_i$. In one embodiment, the maximum and minimum block 206 finds the maximum difference $D_{max}$ and the minimum difference $D_{min}$ between the target pixel X luminance and the luminance of the neighboring pixels X1–X7.

The level computation block 208 estimates a noise level NL associated with the processing window 102. In one embodiment, the noise level computation block 208 estimates the noise level of the neighboring pixel X−1 under the following equation:

$$NL(t-1)=K_n(t-1) \cdot D_{max}(t-1)+[1-K_n(t-1)] \cdot NL(t-2) \qquad (1).$$

The local feature inspection block 210 computes a $K_n$ parameter, which determines the strength of filtering to be performed by the filter 200. Local features include metrics associated with an image. In one embodiment, $K_n$ represents a function associated with the "brightness" of a target pixel X, where $0 \leq K_n \leq 1$. An example of a feature inspection block suitable for use with an embodiment is described in "Non-Linear Adaptive Image Filter For Filtering Noise Such As Blocking Artifacts," Attorney Docket No. 850063.533, which is incorporated herein by reference in its entirety.

Recall that the filter 200 is based on "fuzzy logic" processing. As used herein, "fuzzy logic" generally provides a way to classify data according to a degree of membership in a fuzzy set that varies continuously from zero (not a member) to one (absolutely a member). Fuzzy logic requires a describing function, called a "membership function," to fully define the boundaries of a fuzzy set. The fuzzy set becomes a way of assigning exact mathematical meaning to a subjective sounding linguistic term such as "similarity," "brightness," or "luminance." In one embodiment, the membership computation block 212 generates a membership function wherein the fuzzy set is bounded by two threshold values th1 and th2. The membership computation block 212 generates a membership function corresponding to the sentence "the pixels X and $X_i$ are similar." $X_i$ represents a value of any one of the neighboring pixels. In one embodiment, $X_i$ represents the value relative to the gray level of a neighboring pixel.

If the processing window 102 coincides with a relatively homogenous area of an image, all the differences $D_i$ will be close in terms of their absolute values and thereby will be correlated to noise. It is thus possible to select a membership function that is able to generate the threshold parameters th1 and th2 that substantially coincide with $D_{max}$. On the contrary, when the target pixel X belongs to an edge or a boundary region of an image, the filtering action is made significant only if the differences $D_i$ are small, that is, within the interval of differences of the absolute value of $D_i$ defined by the following expression:

$$\left[ D_{min}; \frac{D_{min}+D_{max}}{2} \right]. \qquad (2)$$

The membership computation block 212 computes the first threshold parameter th1 according to the following equation:

$$th1(t)=K_n(t) \cdot D_{max}(t)+[1-K_n(t)] \cdot D_{min}(t) \qquad (3).$$

The membership computation block 212 computes the second threshold parameter th2 according to the following equation:

$$th2(t) = K_n(t) \cdot D_{max}(t) + [1 - K_n(t)] \cdot \frac{[D_{max}(t) + D_{min}(t)]}{2}. \qquad (4)$$

Note that the threshold parameter th1 is always greater than or equal to the threshold parameter th2.

The similarity evaluation block 214 provides a new pixel value using the similarity evaluator 216 and the final filter 218. The similarity evaluator 216 generates filter coefficients $K_i$, which represent a measure of the degree of similarity between the target pixel X and any one of the neighboring pixels $X_n$ chosen from among the neighboring pixels X1–X7, such that $K_i$ represents any one of a degree of similarity K1–K7. In one embodiment, $K_i$ represents the value produced by the membership computation block 212 according to the membership function corresponding to the sentence "the pixels X and $X_i$ are similar." That is, $K_i$ represents a weighted average of the target pixel X and the neighboring pixels X1–X7 that are part of the processing window 102 used to process the target pixel X.

The final filter 218 generates the output out(t) of the noise filter 200, which output is used to replace the target pixel X in the processing window 102. The output out(t) is determined using the following equation:

$$out(t)=\tfrac{1}{8}\Sigma K_i(t) \cdot X_i+[1-K_i(t)] \cdot X \qquad (5).$$

In one embodiment, the final filtering block 218 separately processes the degrees of similarity K, between a target pixel X and any one of the neighboring pixels $X_i$, and through a final summing stage and produces the output out(t) as the sum of the weighted contributions.

Figure 3:
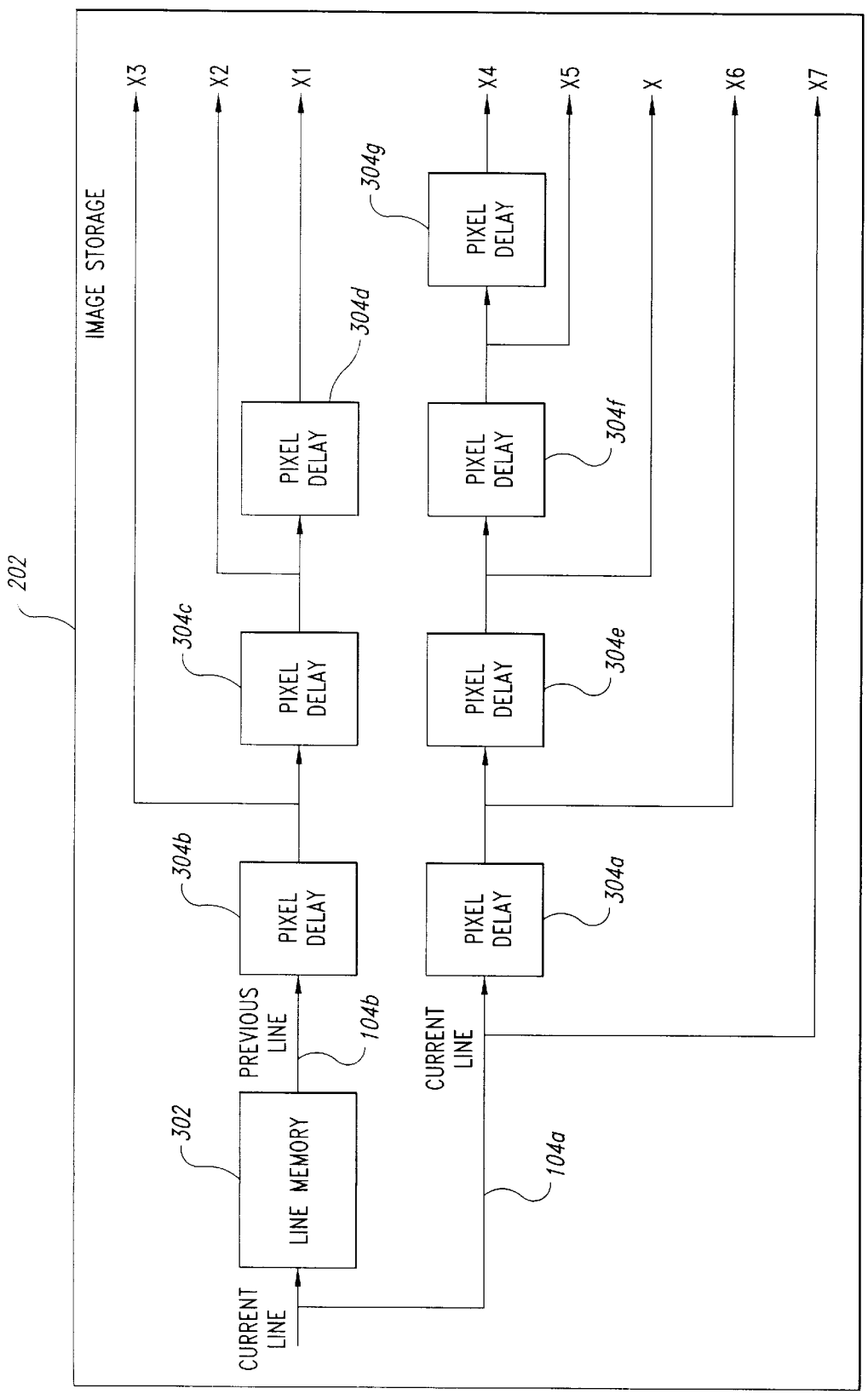
FIG. 3 is a block diagram of an image storage unit of the noise filter in FIG. 2.

Recall that the image storage unit 202 also generates the processing window 102. FIG. 3 shows a block diagram of a circuit suitable for defining the processing window 102. According to FIG. 3, the current scan line 104a is applied to a line memory unit 302 and to a pixel delay 304a. The previous scan line 104b is output from the line memory 302 and is applied to a pixel delay 304b. In an example embodiment, the outputs of the pixel delays 304a and 304b are further delayed using several pixel delays 304c through 304g. In this embodiment, the outputs of the pixel delays 304a through 304g are also coupled directly out of the image storage unit 202 to the remaining components of the noise filter 200 as pixel values X5, X1, X2, X3, X, and X7, respectively. As a result, although the two lines of pixels 104a and 104b are input to the image storage unit 202, the image storage unit 202 outputs all pixels simultaneously in parallel.

Of course, it will be understood by persons skilled in the relevant art that a suitable processing window may be constructed using other well known serial-to-parallel conversion techniques. Similarly, the invention is not limited to a particular number of scan lines, processing window sizes, pixel delays, etc. Other techniques that use information relative to the pixels belonging to at least two successively scanned lines or rows may be used without departing from the scope and spirit of the invention.

Figure 4:
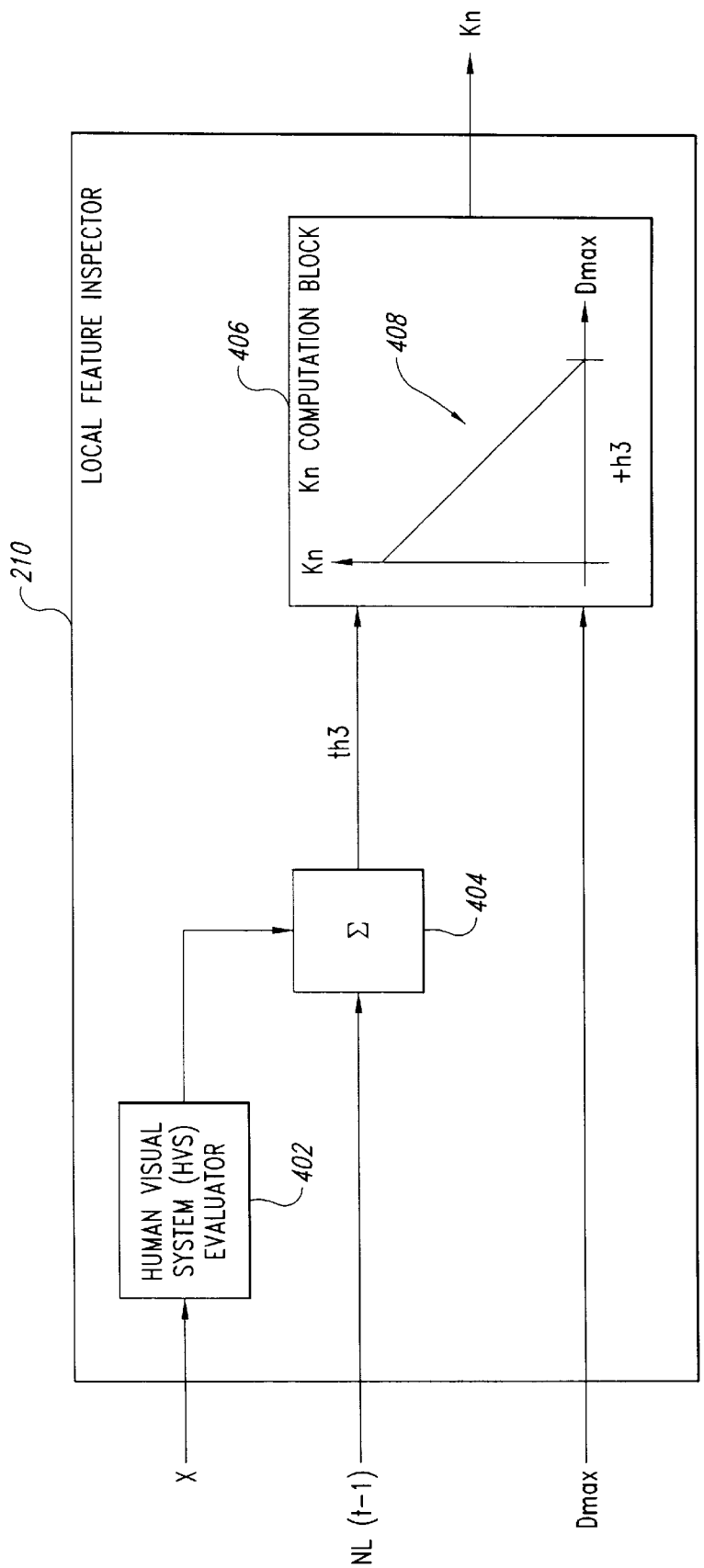
FIG. 4 is block diagram of the local feature inspector used in the noise filter of FIG. 2.

FIG. 4 illustrates the operation of the local feature inspector 210 in greater detail. According to FIG. 4, the local feature inspector 210 includes a human visual system (HVS) evaluator 402, which evaluates a metric of the processing window 102. Generally, human visual systems use algorithms to optimize a compressed image according to the way the human eye perceives the image. Human visual systems are described in "Second-Generation Image Coding: An Overview," by M. M. Reid, R. J. Millar, and N. D. Black, in ACM COMPUTING SURVEYS, Vol. 29, No. 1 (March 1997), Pages 3–29, incorporated herein by reference in its entirety.

In one embodiment, the HVS evaluator 402 evaluates an estimation of a joint measure of human eye sensitivity and noise level. In particular, the HVS evaluator 402 evaluates an estimation of human eye sensitivity to a minimum noticeable gray level difference between the target pixel X and a neighboring pixel to determine "brightness." FIG. 5 is a graphical representation of a human visual system (HVS) evaluator function 500 implemented by the HVS evaluator 402 to evaluate a metric of the processing window 102.

Referring to FIGS. 4 and 5, the HVS evaluator 402 receives the target pixel X and processes it according to the HVS evaluator function 500. In one embodiment, the filter 200 processes a horizontal range of values between 0 and 255. The point B on the HVS evaluator function 500 represents a breakpoint between the different lobes, and is a fixed value. In one embodiment, B=128, and the maximum value that corresponds to "zero" is 255/4=64.

An adder 404 sums the output of the HVS evaluator 402 with an estimate of the neighboring pixel X−1 noise level NL(t−1) and generates a threshold value th3. A $K_n$ computation block 406 weights the maximum difference $D_{max}$ between the target pixel X and the neighboring pixels X1–X7 and threshold value th3 to generate the $K_n$ parameter. The weighting is according to the graphical representation 408. The threshold value th3 depends upon the brightness of the target pixel X.

FIG. 6 is a graphical representation of how one embodiment of the membership computation block 212 computes threshold parameters th1 and th2 to determine the shape of the membership function. The similarity evaluation function 600 is the membership function related to the fuzzy sentence "the pixels X and $X_i$ are similar." Additionally, the similarity evaluator 216 provides filter coefficients $K_i$ by weighting the absolute values of the differences $D_i$ using the similarity evaluation function 600.

Figure 7:
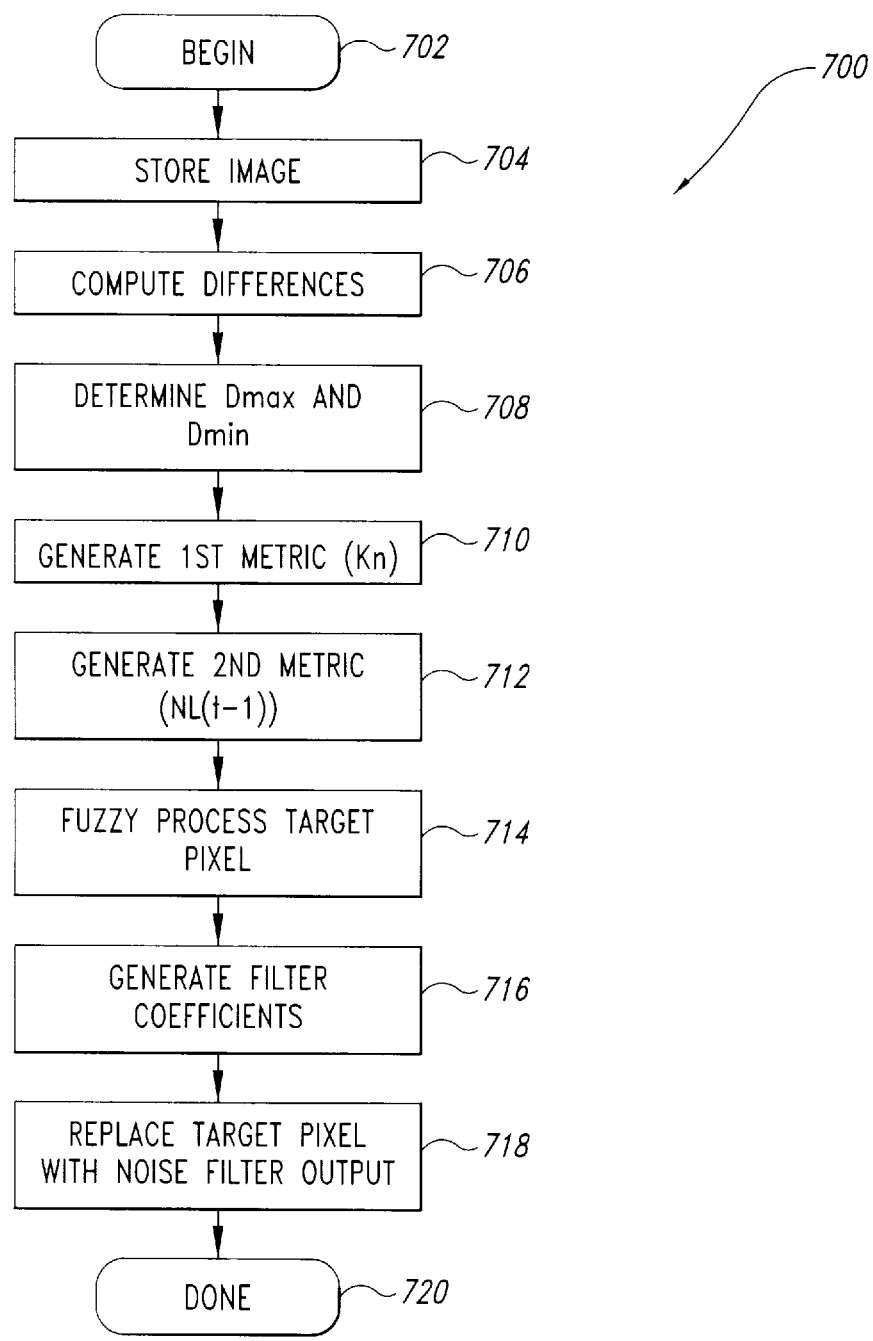
FIG. 7 is a flowchart of a process performed by an example embodiment.

One embodiment of the invention operates according to the noise filtering process 700 depicted in FIG. 7. The noise filtering process 700 begins with task 702, wherein control immediately passes to task 704. Task 704 stores sequences of a scanned image. The scanned image has a current row and a previous row. Portions of the scanned image are arranged in a processing window with several pixels belonging to the current row and to the previous row of the scanned image. The pixels include a target pixel and several neighboring pixels. Each of the pixels in the processing window has a value. In one embodiment, any or all of the pixels in the processing window has a gray level value. In another embodiment, each of the target pixels has a noise level value. In still another embodiment, each of the pixels in the processing window has a brightness (or luminance) value. While a specific "value" is not important for the invention, those skilled in the art will understand that any value can be used in the invention.

Task 706 computes the differences $D_i$ between the value of the target pixel and the neighboring pixels. Task 708 determines a minimum computed difference $D_{min}$ and a maximum computed difference $D_{max}$ selected from among the differences $D_i$. Task 710 generates a first metric from a predetermined sensorial response. In one embodiment, the first metric is representative of a weighting coefficient $K_n$, which is a joint measure of human eye sensitivity and noise level.

Task 712 generates a second metric representative of a noise level estimation associated with the neighboring pixel X−1. Any one of the neighboring pixels can be designated as a neighboring pixel X−1. The neighboring pixel X−1 immediately follows the target pixel X. Task 712 also generates a third metric representative of a noise level estimation associated with the neighboring pixel X−2. Any one of the neighboring pixels may be designated as a neighboring pixel X−2, wherein the neighboring pixel X−2 immediately follows the neighboring pixel X−1.

Task 714 processes by fuzzy logic the values of the target pixel according to a membership function, the minimum computed difference $D_{min}$, the maximum computed difference $D_{max}$, and the first metric $K_n$. Task 716 generates a filter coefficient according to a equation (5). After the filter coefficient is generated, task 716 replaces the value of the target pixel X in the scanned image. Task 720 completes the operation of the noise filtering process 700.

Recall that the filter 200 in one embodiment uses recursive noise level estimation to reduce image noise. The filter 200 recursively processes noise levels from pixel to pixel using equation (1), such that as the processing window 102 moves from pixel to pixel in an image, the noise level of neighboring pixels are successively estimated. Thus, as the neighboring pixel X−1 changes in the processing window 102, the estimated noise level NL(t−1) of the pixel X−1 changes accordingly.

The filter 200 may be implemented using hardware, software, or a combination of hardware and software, and may be implemented in a computer system or other processing system. In an embodiment where the invention is implemented using a combination of hardware and software, the invention may be implemented using an application-specific integrated circuit (ASIC). In an embodiment where the invention is implemented using hardware, the hardware components may be a state machine. In an embodiment where the filter 200 is implemented using software, the software may be stored on a computer program product (such as an optical disk, a magnetic disk, a floppy disk, etc.) or a program storage device (such as an optical disk drive, a magnetic disk drive, a floppy disk drive, etc.). The filter 200 may be implemented in a microprocessor or as a programmable digital filter.

Although specific embodiments of, and examples for, the invention are described herein for illustrative purposes, various equivalent modifications are possible within the scope of the invention, as will be recognized by those skilled in the relevant art. Thus, while several embodiments are described with respect to noise suppression, the teachings provided herein can be applied to image enhancement operations such as contrast improvement, edge enhancement, spatial filtering, image smoothing, and image sharpening, for example.

These and other changes may be made to the invention in light of the above-detailed description. In general, in the following claims, the terms used should not be construed to limit the invention to the specific embodiment disclosed in the specification and claims, but should be construed to include all image processors that operate under the claims to provide a non-linear filter that reduces noise using recursive noise level estimation.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. An image noise reduction filter, comprising:
    a differencing block that computes absolute values of differences between a plurality of metrics of a target pixel X and a plurality of neighboring pixels in a processing window, and that determines a minimum computed difference and a maximum computed difference selected from among the absolute values of differences between the metrics of the target pixel X and the plurality of neighboring pixels in the processing window; and
    a new pixel value generator, coupled to the differencing block, that generates a replacement value for the target pixel based on a weighted average of the absolute values of degrees of similarity between the target pixel X and the plurality of neighboring pixels.

2. The image noise reduction filter of claim 1, further comprising a metric computation block, coupled to the differencing block, that computes a first metric that represents a weighted luminance value for the target pixel X, and a second metric that represents an estimated noise level of a neighboring pixel (X−1) selected from among the plurality of neighboring pixels.

3. The image noise reduction filter of claim 1, further comprising a fuzzy logic processor, coupled to the differencing block, that generates a first threshold value and a second threshold value, which represent the boundaries of a fuzzy set, the fuzzy set boundaries being based on values representative of a maximum and minimum value of an absolute value of the differences among the target pixel X and the plurality of neighboring pixels.

4. The image noise reduction filter of claim 1, further comprising a filter coefficient block, coupled to the differencing block, that generates a filter coefficient that represents the measure of the degree of similarity between the target pixel and any one of the plurality of neighboring pixels.

5. A method of filtering noise in a scanned image, comprising the steps of:
    providing a processing window for portions of a scanned image, the processing window having a target pixel and a plurality of neighboring pixels; and
    substituting the target pixel with a weighted average of the degree of similarity between the target pixel and the neighboring pixels,
    wherein the degree of similarity depends on a noise level affecting the scanned image and a local brightness of the processing window.

6. The method of claim 5, further comprising the step of computing an absolute value of the differences among the target pixel and the plurality of neighboring pixels.

7. The method of claim 5, further comprising the step of determining a maximum and minimum value of an absolute value of the differences among the target pixel and the plurality of neighboring pixels.

8. The method of claim 5, further comprising the step of computing a filter strength based on a gray level associated with the target pixel, on a maximum value of the absolute value of the differences among the target pixel and the plurality of neighboring pixels, and on the noise level affecting the scanned image.

9. The method of claim 5, further comprising the step of evaluating a minimum noticeable gray level difference between the target pixel and a neighboring pixel selected from among the plurality of neighboring pixels.

10. The method of claim 5, further comprising the step of summing an evaluation of a minimum noticeable gray level difference between the target pixel and a first neighboring pixel selected from among the plurality of neighboring pixels with an estimation of a noise level associated with a second neighboring pixel selected from among the plurality of neighboring pixels.

11. The method of claim 5, further comprising the step of estimating a noise level associated with a neighboring pixel selected from among the plurality of neighboring pixels using the equation $NL(t-1)=K_n(t-1) \cdot D_{max}(t-1)+[1-K_n(t-1)] \cdot NL(t-2)$.

12. The method of claim 5, further comprising the step of determining a shape of a membership function in a fuzzy logic process according to a first threshold value computed using the equation $th1(t)=K_n(t) \cdot D_{max}(t)+[1-K_n(t)] \cdot D_{min}(t)$ and a second threshold value computed using the equation $th2(t)=K_n(t) \cdot D_{max}(t)+[1-K_n(t)] \cdot [D_{max}(t)+D_{min}(t)]/2$.

13. The method of claim 5, further comprising the step of generating a plurality of filter coefficients that represent the measure of the degree of similarity between the target pixel and any one of the neighboring pixels.

* * * * *